United States Patent
Khuu et al.

(10) Patent No.: US 9,312,977 B1
(45) Date of Patent: Apr. 12, 2016

(54) SYSTEM AND METHOD TO PROVIDE CHANNEL ACCESS SYNCHRONIZATION WITHOUT TIME-STAMP EXCHANGE IN TIME DIVISION MULTIPLE ACCESS (TDMA) MULTI-HOP NETWORKS

(71) Applicant: BAE Systems Information And Electronic Systems Integration Inc., Nashua, NH (US)

(72) Inventors: Phong C. Khuu, Ashburn, VA (US); Brian D. Loop, Gainesville, VA (US); Qui M. Le, Chantilly, VA (US); Kevin M. McNeill, Alexandria, VA (US); Michael J. Weber, Warrenton, VA (US); Tim McNevin, Reston, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 269 days.

(21) Appl. No.: 14/012,421

(22) Filed: Aug. 28, 2013

Related U.S. Application Data

(60) Provisional application No. 61/693,903, filed on Aug. 28, 2012.

(51) Int. Cl.
  *H04W 4/00* (2009.01)
  *G06F 1/00* (2006.01)
  (Continued)

(52) U.S. Cl.
  CPC ............. *H04J 3/1694* (2013.01); *H04W 8/005* (2013.01); *H04W 40/12* (2013.01); *H04W 56/00* (2013.01); *H04W 84/18* (2013.01)

(58) Field of Classification Search
  CPC . H04W 84/18; H04W 56/001; H04W 56/002; H04W 56/00; H04W 40/12; H04W 52/0126; H04W 8/005; H04J 3/06352; H04J 3/0658; H04J 3/0697; H04B 7/2643; H04L 27/2656; H04L 1/0007; H04L 1/0002
  USPC ............ 370/350, 458, 503; 713/400; 714/704
  See application file for complete search history.

(56) References Cited

U.S. PATENT DOCUMENTS 6,404,756 B1 6/2002 Whitehill et al.
6,839,334 B1 1/2005 Krishnamoorthy et al.
(Continued)

OTHER PUBLICATIONS

Kerkez, Branko; "Adaptive Time Synchronization and Frequency Channel Hopping for Wireless Sensor Networks;" Electrical Engineering and Computer Sciences University of California at Berkeley; Technical Report No. UCB/EECS-2012-163; Jun. 6, 2012.*

(Continued)

*Primary Examiner* — Alpus H Hsu
*Assistant Examiner* — Elton Williams
(74) *Attorney, Agent, or Firm* — Joseph A. Sebolt; Sand & Sebolt; Daniel J. Long

(57) ABSTRACT

The present invention relates to a system and method for providing channel access synchronization in a time division multiple access (TDMA) multi-hop network employing a plurality of time slots defined within a frame structure which repeats. The system and method includes nodes which have local clock variables. The local clock variables generate an expected arrival time of signals from other nodes in the network. Each node then determines whether the local clock variable needs adjusting after receiving a transmission and comparing the expected arrival time with the actual arrival time. Thus, time synchronization across the network is distributed and updated locally at each node. Networks may be merged by casting out nodes in one network and joining those cast out nodes with the other network. Newly joined nodes are thereafter time synchronized into their new network by comparing actual and expected arrival times and updating their clock accordingly.

9 Claims, 6 Drawing Sheets

(51) Int. Cl.
*G06F 11/00* (2006.01)
*H04J 3/16* (2006.01)
*H04W 56/00* (2009.01)
*H04W 84/18* (2009.01)
*H04W 40/12* (2009.01)
*H04W 8/00* (2009.01)

(56) References Cited

U.S. PATENT DOCUMENTS

| | | | |
|---|---|---|---|
| 7,107,498 B1* | 9/2006 | Schmidt et al. | 714/704 |
| 7,283,494 B2 | 10/2007 | Hammel et al. | |
| 8,244,249 B1* | 8/2012 | Everson et al. | 455/436 |
| 2003/0067892 A1* | 4/2003 | Beyer | H04L 45/20 370/328 |
| 2008/0232344 A1* | 9/2008 | Basu et al. | 370/350 |
| 2008/0253341 A1* | 10/2008 | Cordeiro et al. | 370/338 |
| 2011/0255521 A1 | 10/2011 | Bohn et al. | |
| 2014/0105205 A1* | 4/2014 | Honig et al. | 370/350 |

OTHER PUBLICATIONS

Jeremy Elson, Lewis Girod, Deborah Estrin—"Fine-Grained Network Time Synchronization Using Reference Broadcasts", Department of Computer Science, University of California, 2002.

* cited by examiner

SYSTEM AND METHOD TO PROVIDE CHANNEL ACCESS SYNCHRONIZATION WITHOUT TIME-STAMP EXCHANGE IN TIME DIVISION MULTIPLE ACCESS (TDMA) MULTI-HOP NETWORKS

CROSS-REFERENCE TO RELATED APPLICATION

This application claims priority from U.S. Provisional Application Ser. No. 61/693,903, filed Aug. 28, 2012, the disclosure of which is incorporated herein by reference.

BACKGROUND OF THE INVENTION

1. Technical Field

The present invention relates to data transmission. More particularly, the present invention relates to reducing collisions by providing improved channel access synchronization across a network. Specifically, the present invention relates to node synchronization without a time-stamp exchange through adjusting slot timing based on the received preamble of other nodes in the network.

2. Background Information

Time division multiple access (TDMA) is a channel access method for shared networks. It allows several users or nodes to share the same frequency channel by dividing the signal into different time slots. The users or nodes transmit in rapid succession, one after the other, each using its own time slot. This allows multiple users or nodes to share the same transmission medium (e.g. radio frequency channel) while using only a part of its channel capacity. TDMA is used extensively in satellite systems and combat-net radio systems. However, inasmuch as to combat-net radio systems are typically a mobile ad hoc network, the chaotic environment and ever changing number and distance of users or nodes has presented problems for the standard TDMA channel access method.

Attempts have been made to utilize the channel access methodology of TDMA in mobile ad hoc networks. Mobile ad hoc networks are self-configuring infrastructure-less networks of mobile devices connected by wireless communication, and may include nodes which are greater than one hop from each other. Each device in a mobile ad hoc network is free to move independently in any direction, and will therefore change its links to other devices frequently. Each must forward traffic unrelated to its own use, and therefore also be a router. The primary challenge in building a mobile ad hoc network is equipping each device to continuously maintain the information required to properly route traffic. Such networks may operate by themselves or may be connected to the larger Internet. However, adapting TDMA to a mobile ad hoc network is particularly difficult because the nodes can move around and vary the timing advance required to make its transmission match the gap in transmission from its peers.

Thus, it is both critical and difficult to synchronize time in TDMA mobile ad hoc networks. As discussed above, each node in this network transmits during an assigned time slot of a frame, starting at a given start of slot time ($T_{SOS}$). TDMA assumes $T_{SOS}$ is synchronized across all nodes in the network as collisions will occur if $T_{SOS}$ is not synchronized among all of the network nodes. However, in the mobile ad hoc network environment, $T_{SOS}$ can become out of sync as nodes move around.

Some prior art systems attempt to address the out-of-sync problem by configuring the receiving nodes to allocate a small listening window immediately following a perceived $T_{SOS}$ boundary for a particular transmitting node. If a preamble is not detected within that receiving window, the receiving node will flag the condition as an error and reset the receiving circuitry. Thus, if the $T_{SOS}$ boundary between the sending node and receiving node is not at least somewhat in sync, communication will not be possible because the receiving node will never be receiving while the transmitting node is transmitting the preamble. The two nodes will continuously miss "hearing" each other. Therefore, these prior art systems are not suitable for mission critical ad hoc mobile networks such as combat-net radio systems due to their unreliability.

Other prior art attempts to address the out-of-sync issue implement a global clock or some universal monotonically increasing value for all the nodes to utilize for their timing. This method requires time stamp or counter values to be exchanged among the nodes, with the nodes adjusting their internal timers accordingly and calculating $T_{SOS}$ therefrom. Such a system requires one leader node to set and distribute the global clock. However, in a mobile ad hoc network, no node is guaranteed to remain in the network. Thus, selecting and maintaining a leader node quickly becomes unmanageable. Further, such a time stamp exchanging method requires a working communication channel and does not handle the case of sub-network merging in which the timing from the merging networks may be so different that successful initial communication is not guaranteed. Thus, the time-stamps never get exchanged and the merging network never communicates with the other network.

Thus, there is a tremendous need in the art to overcome the above stated disadvantages of the prior art for providing channel access synchronization without time-stamp exchange in a TDMA multi-hop and/or mobile ad hoc network.

SUMMARY

In one aspect, the invention may provide a method for providing channel access synchronization in a time division multiple access (TDMA) multi-hop network employing a plurality of time slots defined within a frame structure which repeats, the method comprising: providing a network of nodes, wherein each node includes a processor connected to a memory by a logic circuitry, and a clock variable stored in the memory; transmitting a signal from a first node in the network of nodes to a second node in the network of nodes during a first timeslot in the plurality of timeslots, wherein the first timeslot is assigned to the first node; using the processor and the clock variable of the second node to calculate an expected arrival time of the signal at the second node; receiving the signal at the second node at an actual arrival time; comparing the expected arrival time to the actual arrival time; and adjusting the clock variable of the second node if the difference between the expected arrival time and the actual arrival time is not within a threshold.

In another aspect, the invention may provide a system to provide channel access synchronization without time-stamp exchange in a multi-hop network, said system comprising: a channel access scheme employing a frame structure which repeats, with a plurality of timeslots being defined within said frame structure; a plurality of nodes communicating via the channel access scheme, each node comprising: a processor connected to a memory by a logic circuitry; an adjustable clock variable stored in the memory; a receiver element connected to the memory and processor by the logic circuitry, wherein the receiver element is adapted to receive a signal from a transmitting node and store an actual arrival time variable in the memory upon receipt of the signal, wherein the transmitting node is one of the other nodes in the network; an expected arrival time variable associated with the signal and stored in the memory, wherein the expected arrival time is derived from the clock variable; a threshold variable stored in the memory; and wherein the processor adjusts the clock variable if the expected arrival time and the actual arrival time are not within the threshold.

In another aspect, the invention may provide a communication node operating in a time division multiple access (TDMA) network employing a frame structure which repeats, with a plurality of timeslots being defined within said frame structure, said communication node comprising: a processor connected to a memory by a logic circuitry; a receiver element connected to the processor and memory by the logic circuitry and adapted to receive a signal transmitted by a signal generator and to store an actual arrival time in the memory; a clock variable stored in the memory and adapted for use by the processor in calculating an expected arrival time for the signal and storing the expected arrival time in the memory; a threshold variable stored in the memory; wherein the processor compares the expected arrival time and the actual arrival time and derives an offset variable which is stored in memory; and wherein the processor compares the offset variable and the threshold variable and increments the clock variable by the offset if the offset variable is greater than the offset variable.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A system and method for providing channel access synchronization without the need to exchange time-stamp messages in a time division multiple access (TDMA) network is shown in FIGS. 1-8 and referred to generally herein as system 1. Various non-novel features found in the prior art relating to TDMA architecture, protocols, and channel access are not discussed herein. The reader will readily understand the fundamentals of TDMA channel access schemes are within the prior art and readily understood by one familiar therewith.

Figure 1:
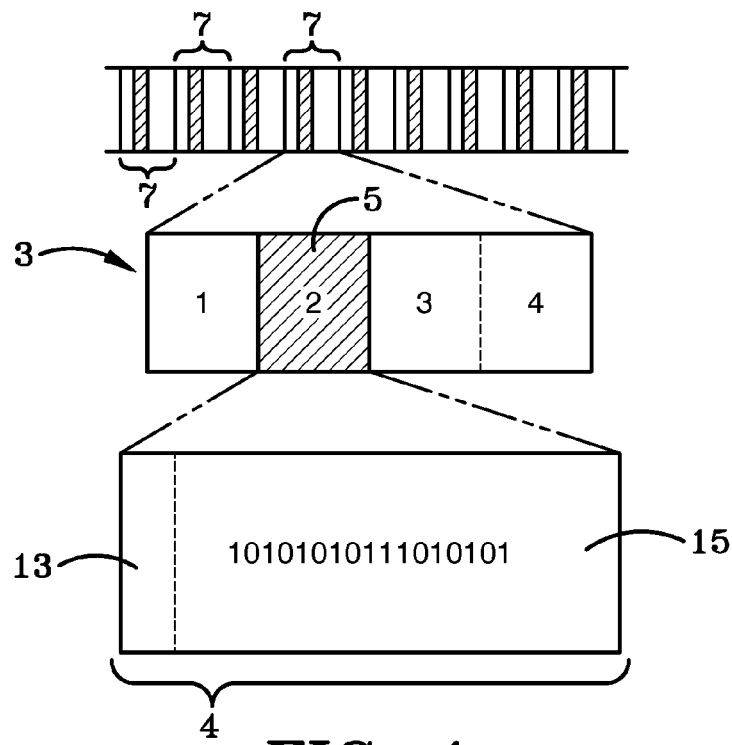
FIG. 1 is a diagrammatical view of elements of a time division multiple access channel access scheme.
Figure 2:
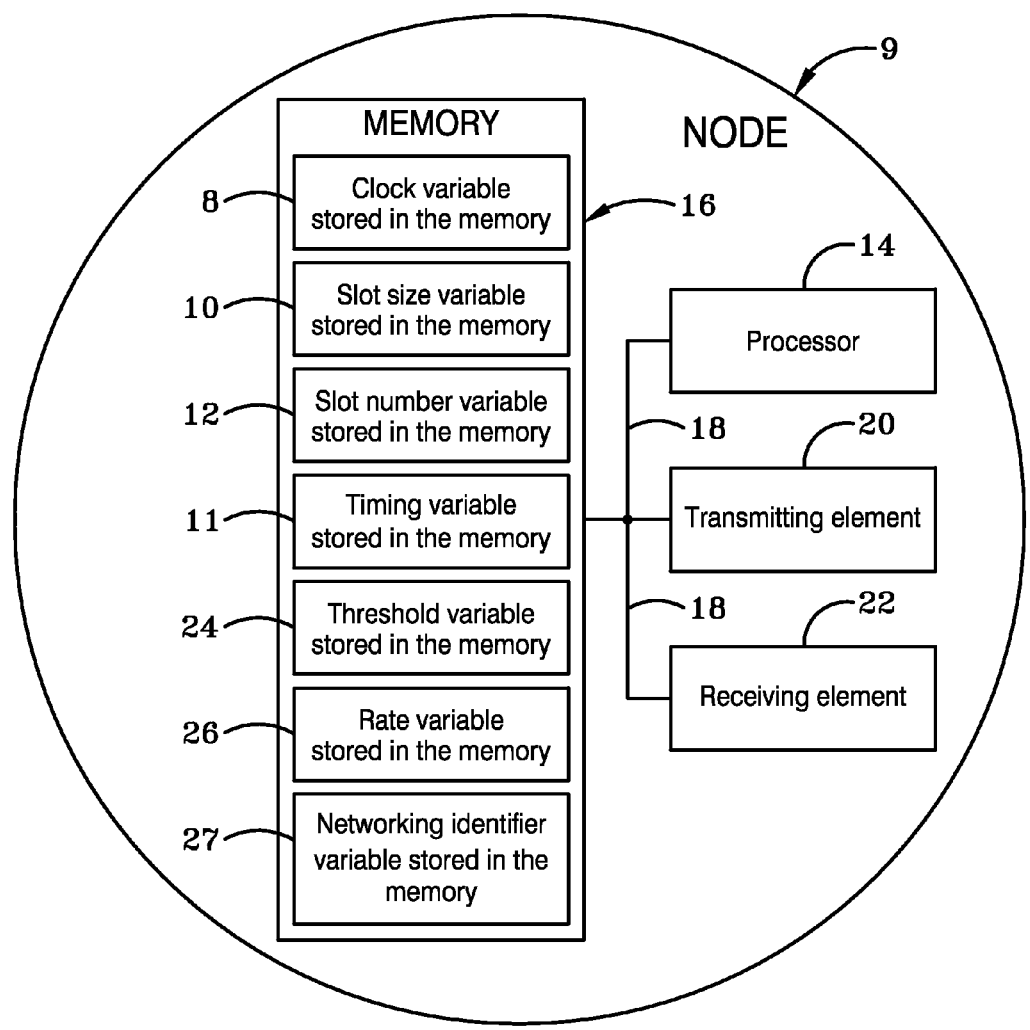
FIG. 2 is a diagrammatical view of an embodiment of a node in the present invention.

As shown in FIGS. 1 and 2, system 1 is adapted to utilize a TDMA channel access scheme 3 which provides different time slots 5 to different network entities in a cyclically repetitive frame structure 7. Time slots 5 are assigned to a particular transmitting and receiving entity in an underlying communication network 6, hereinafter referred to as nodes 9. For example, node 9A may use time slot 5A, node 9B time slot 5B, etc., until the last node 9 or until the number of slots are exhausted in network 6. The cycle starts over again, in a repetitive pattern, until a connection is ended and that particular time slot 5 becomes free or assigned to another node 9. Nodes 9 typically include a processor 14 and a memory 16 connected together by logic circuitry 18, and any other hardware or software commonly found in the art. Nodes 9 further include a transmitter element 20 and a receiver element 22 connected to processor 14 and memory 16 by logic circuitry 18.

System 1 is implemented such that each node 9 transmits data via transmitter element 20 during the time slot 5 associated with that particular node 9 and receives transmitted data via receiver element 22 during time slots 5 not associated with that particular node 9. Each node 9 includes several variables stored and updated locally, including a clock variable 8, a slot size variable 10, and a slot number variable 12. From these variables, a start of slot time variable 11, henceforth known as $T_{SOS}$ 11, may be derived and stored in memory 16, which indicates when that particular node 9 should begin sending data, i.e. when time slot 5 for that node 9 starts. One familiar with the art may use the term "$T_{SOS}$" to refer to each start of slot time for each consecutive slot in channel access scheme 3. However, for clarity, the present invention designates the term "$T_{SOS}$ 11" as the start of slot time assigned to a particular node 9. Thus, $T_{SOS}$ 11 refers to when node 9 should start sending preamble 13, as $T_{SOS}$ 11 is the start of slot time for the slot assigned to node 9.

Clock 8 and $T_{SOS}$ 11 also serve as reference points to the overall timing of system 1, as time slots 5 and $T_{SOS}$ 11 for other nodes are easily calculated from the local instance of clock 8 and/or $T_{SOS}$ 11 of that particular node 9. System 1 is further implemented such that each node 9 transmits a data 4, which includes a preamble 13 starting at $T_{SOS}$ 11 when time slot 5 associated with that particular node 9 becomes the active time slot 5. Preamble 13 is followed by a data block 15 which lasts approximately until time slot 5 ends.

It will be readily understood that the reference variable to indicate time may be implemented in any number of ways and the implementation discussed herein is simply an exemplary embodiment. For example, rather than $T_{SOS}$ 11, system 1 may be implemented such that each node 9 includes a start of frame variable to keep track of the frame start time. This style of implementation would also include a slot size variable to indicate how much time each slot utilizes and a slot offset variable to indicate which slot is assigned to that particular node 9. Using the aforementioned three variables, each node 9 would calculate $T_{SOS}$ 11 for its given slot and begin transmitting at $T_{SOS}$ 11. Further, system 1 may be implemented without an explicit $T_{SOS}$ 11 variable, and may rely solely on clock 8, slot size 10, and slot number 12 to determine when to begin transmitting preamble 13 of that particular node 9. Thus, any method of tracking the start time and/or slot time 5 of nodes 9 in a distributed fashion, locally by that particular node 9, is contemplated by the present invention.

Figure 3:
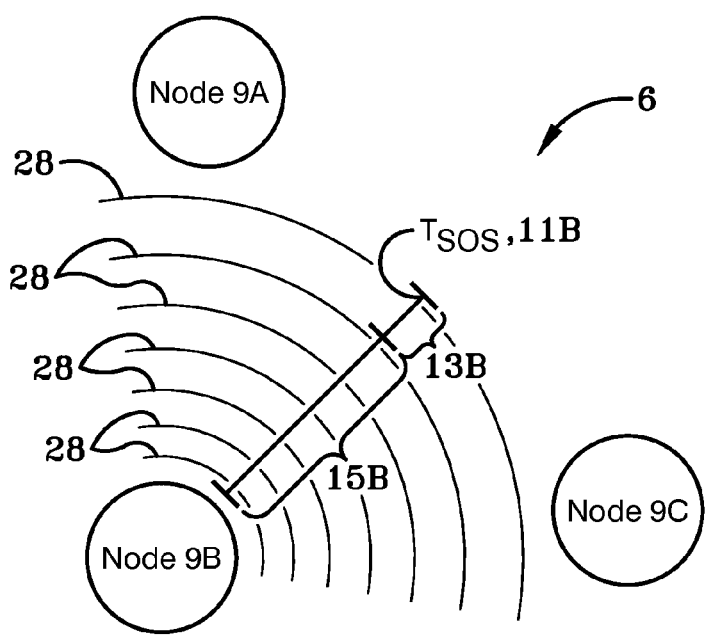
FIG. 3 is a diagrammatical view of a network of three nodes of the present invention with one node transmitting a signal.

An example of a typical transmission in system 1 is shown in FIG. 3. A node 9B transmits a preamble 13B at time $T_{SOS}$ 11B followed by a data block 15B via wireless radio frequencies 28. Pursuant to TDMA channel access scheme 3, the entire transmission of preamble 13B and data block 15B occur during a time slot 5B. Inasmuch as nodes 9A and 9C are not scheduled to transmit during time slot 5B, nodes 9A and 9C are in receiving mode, listening to radio frequencies 28 for preamble 13B and data block 15B from node 9B. Under ideal conditions, nodes 9A and 9C expect to receive preamble 13B at a particular time and nodes 9A and 9C actually receive preamble 13B at that expected time, possibly plus some extremely small buffer for propagation delay. Another mechanism for realizing synchronous timing within system 1 is by computing the difference between the expected arrival time of preamble 13B and the actual arrival time of preamble 13B, and considering whether the difference is less than a set threshold variable 24 saved in memory 16.

Under non-ideal conditions, when the difference between the expected preamble 13 arrival time and the actual preamble 13 arrival time is greater than threshold 24, the receiving node 9 updates its clock 8 and inherently its time $T_{SOS}$ 11 to account for the difference in actual arrival time vis a vis expected arrival time. For example, if the actual arrival time of preamble 13 is ten microseconds after the expected arrival time of preamble 13, clock 8 is moved ahead by ten microseconds. Likewise, inasmuch as $T_{SOS}$ 11 is calculated off clock 8, $T_{SOS}$ 11 is moved ahead by ten microseconds by either recalculating $T_{SOS}$ 11 off the new clock 8 timing, or by incrementing the variable holding $T_{SOS}$ 11 by ten microseconds.

Figure 4:
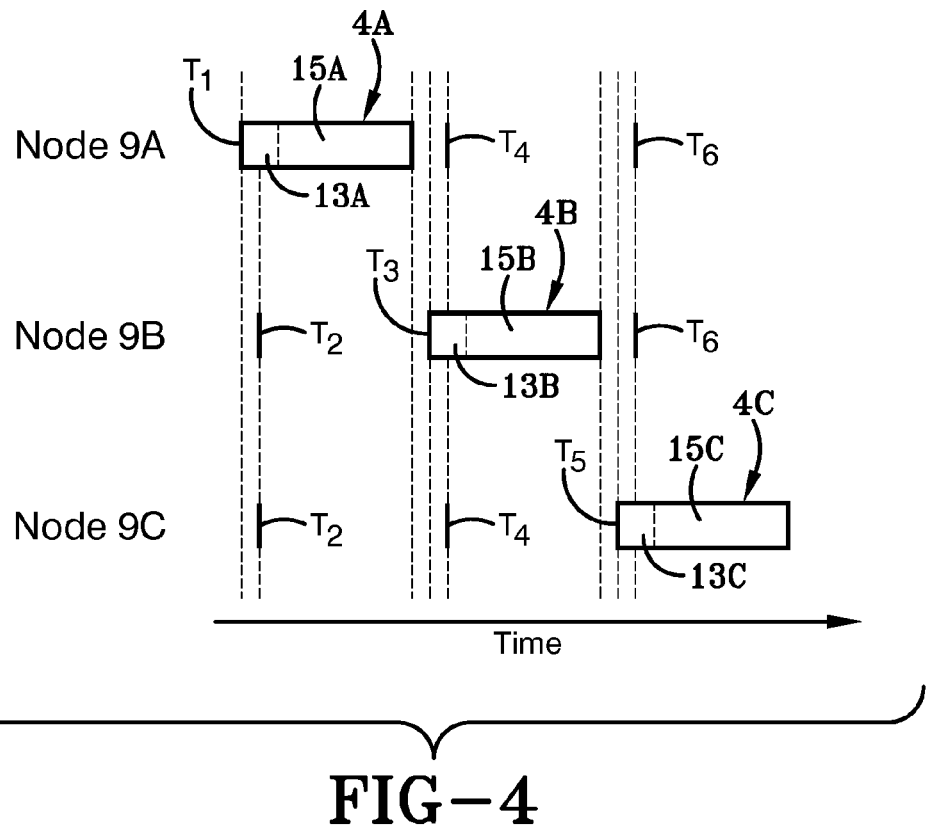
FIG. 4 is a graphical view of three nodes of the present invention and the relative timing of transmissions and updates of internal clock variables with respect to an x-axis representing time.

As shown in FIG. 4, the method of updating local clock 8 variables of nodes 9A, 9B, and 9C, are graphed relative to a time-axis. In this example, Node 9A begins sending data 4A at a time T1. Shortly thereafter, nodes 9B and 9C receive preamble 13A of data 4A at a time T2. Using their local instance of clock 8, nodes 9B and 9C compare their expected arrival time of preamble 13A with the actual arrival time of preamble 13A. In FIG. 3, for both nodes 9B and 9C, the difference between the expected arrival time and the actual arrival time is outside of the appropriate threshold, which may be a variable stored in memory 16 such as threshold variable 24. Thus, nodes 9B and 9C adjust their internal clock 8 and $T_{SOS}$ 11 variables relative to the arrival time of preamble 13A and to more closely match clock 8A and $T_{SOS}$ 11A of node 9A. This continues with node 9B sending data 4B at a time T3, nodes 9A and 9C receiving preamble 13B at a time T4, and nodes 9A and 9C performing a localized clock 8 and $T_{SOS}$ 11 adjustment. Node 90 then sends data 4C at a time T5 and nodes 9A and 9B receive preamble 130 at a time 16 and perform a localized clock 8 and $T_{SOS}$ 11 adjustment accordingly. This process continues and a localized clock 8 and $T_{SOS}$ 11 update is initiated whenever necessary. While FIG. 3 is an exemplary representation, in practice, the syncing of the clock 8 variables will quickly converge towards a finely tuned synchronization of all of the local instances of clock 8 and $T_{SOS}$ 11 variables within each node 9 in the given network 6.

FIG. 3 shows three consecutive clock 8 adjustments for clarity. A large number of continuous adjustments of clock 8 and $T_{SOS}$ 11 variables is atypical.

Inasmuch as there is no global or universal clock or time-stamp exchanges in system 1, clock 8 is the local reference point for when to expect the arrival or incoming preambles 13. Thus, accuracy of clock 8 is critical to keeping data flowing through network 6. Inasmuch as preambles 13 are continuously arriving at any given node 9 in the receiving mode, clock 8 may be continuously updated and adjusted as needed to maintain synchronization across network 6. This allows for various nodes 9 to move around and encounter differences in propagation delay due to this movement, for example, when nodes 9 are embodied as handheld radios or vehicles moving around in a chaotic battlefield environment. Across system 1 and network 6, the timing reference point (clock 8) is distributed to all nodes 9 and customized to be local to that node 9. Thus, synchronization is maintained and ensured, even in a mobile ad hoc situation and the operationally difficult task of selecting and dedicating a single global reference point is eliminated.

In light of the above, it has been discovered that multiple efficiencies are realized when only preambles 13 of nodes 9 that are within a two hop distance from the receiving node 9 are used to update the local clock 8 variable. Thus, local processing power is conserved while still maintaining adequate synchronization across network 6. Hop distances from any given node 9 are readily known by that local node 9 as part of the routing logic underlying TDMA communication transport layers. Thus, the set of nodes 9 which are one or two hops from the local node 9 are inherently known by the local node 9 and efficiencies are realized by having this information readily available in memory 16.

Figure 5:
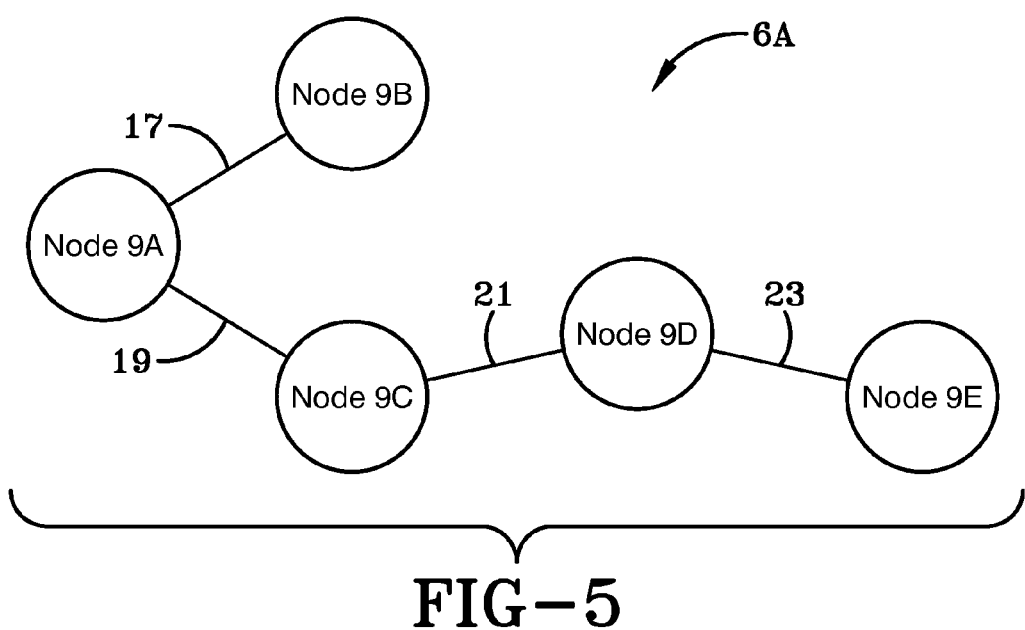
FIG. 5 is a diagrammatical view of a network of the present invention having five nodes arranged in the illustrated network topology.

In light of the above, FIG. 5 illustrates a network 6A which includes five nodes 9 connected in the illustrated topology. Node 9A is connected via one hop to node 9B by hop 17 and connected via one hop to node 9C by a hop 19. Node 9A is connected via two hops to node 9D by hop 19 and a hop 21. Node 9A is connected via three hops to node 9E by hop 19, hop 21, and a final hop 23. Given network 6A and the topology illustrated in FIG. 4, any preamble 13E which arrives at node 9A from node 9E is not taken into consideration when determining whether local clock 8A and/or time variable $T_{SOS}$ 11A for node 9A needs adjustment. Preambles 13E which arrive at node 9A from node 9E are simply received and passed into and through the communication system of node 9A without comparing the actual arrival time with the expected arrival time of preamble 13E.

Figure 7:
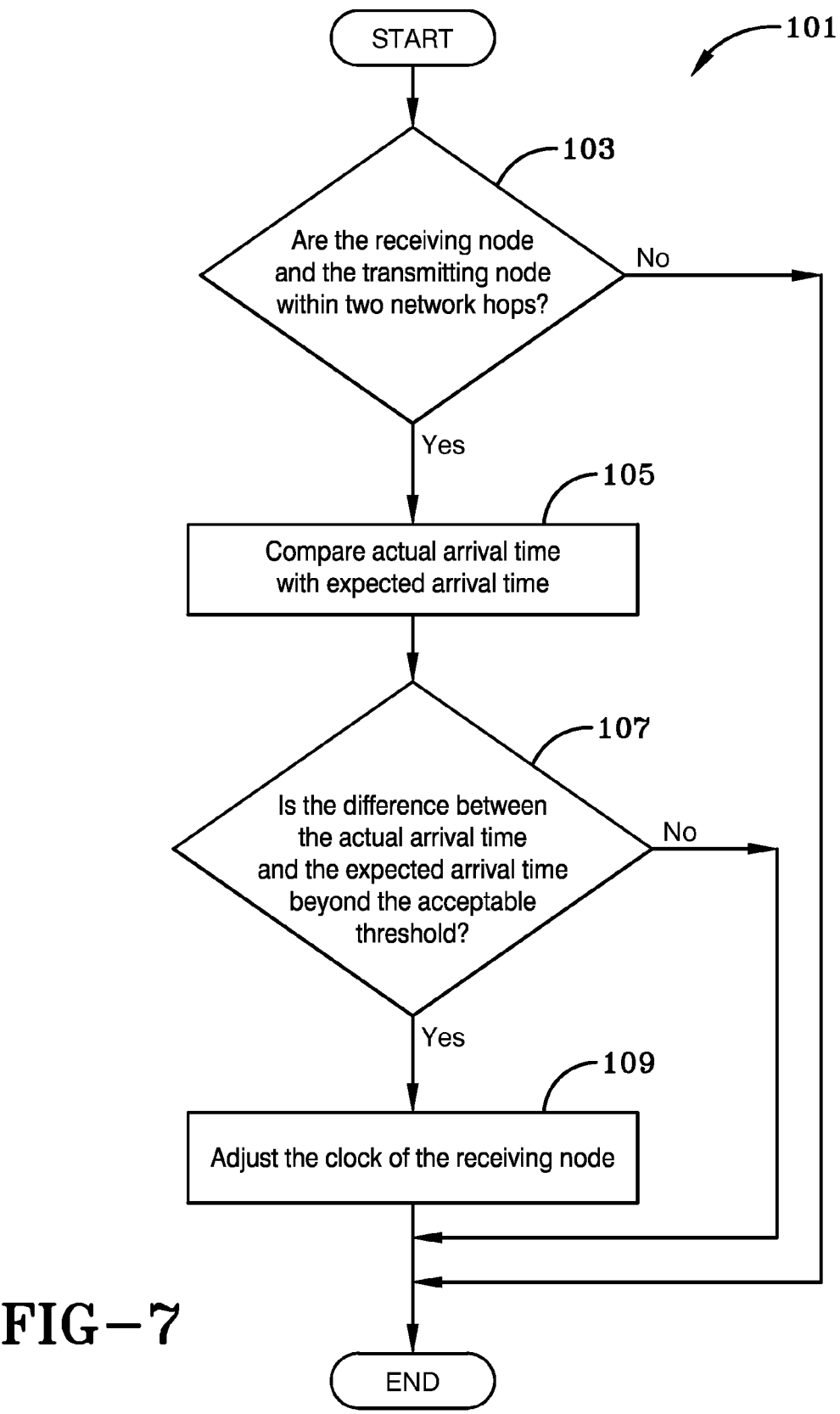
FIG. 7 is a method of the present invention for updating a clock variable of a node.

FIG. 7 illustrates a method 100 to provide channel access synchronization without time-stamp exchange in a TDMA multi-hop network. Method 100 starts with a determining step 103. Step 103 determines whether a received preamble 13 is within a two network hop distance to the receiving node 9. As stated above, if it is determined that the received preamble 13 is greater than two network hops, system 1 does not adjust clock variable 8. As such, step 103 continues to end the method if the received preamble 13 is greater than two network hops. If the received preamble 13 is within two network hops, step 103 continues to a step 105. Step 105 compares the actual arrival time of the received preamble 13 and the expected arrival time of the received preamble 13 and calculates the difference. Step 105 then proceeds to a determining step 107. Step 107 determines whether the difference between the expected arrival time and the actual arrival time is within a given threshold, which may be stored in memory 16 such as threshold variable 24. If the difference is within the acceptable threshold 24, step 107 continues to end the method. If the difference is not within the acceptable threshold 24, step 107 continues to a step 109. Clock 8 of the node which received preamble 13 is adjusted in step 109. Any method of calculating the applied adjustment may be encompassed by the present invention. Step 109 proceeds to end the method after clock 8 is adjusted accordingly.

Figure 6:
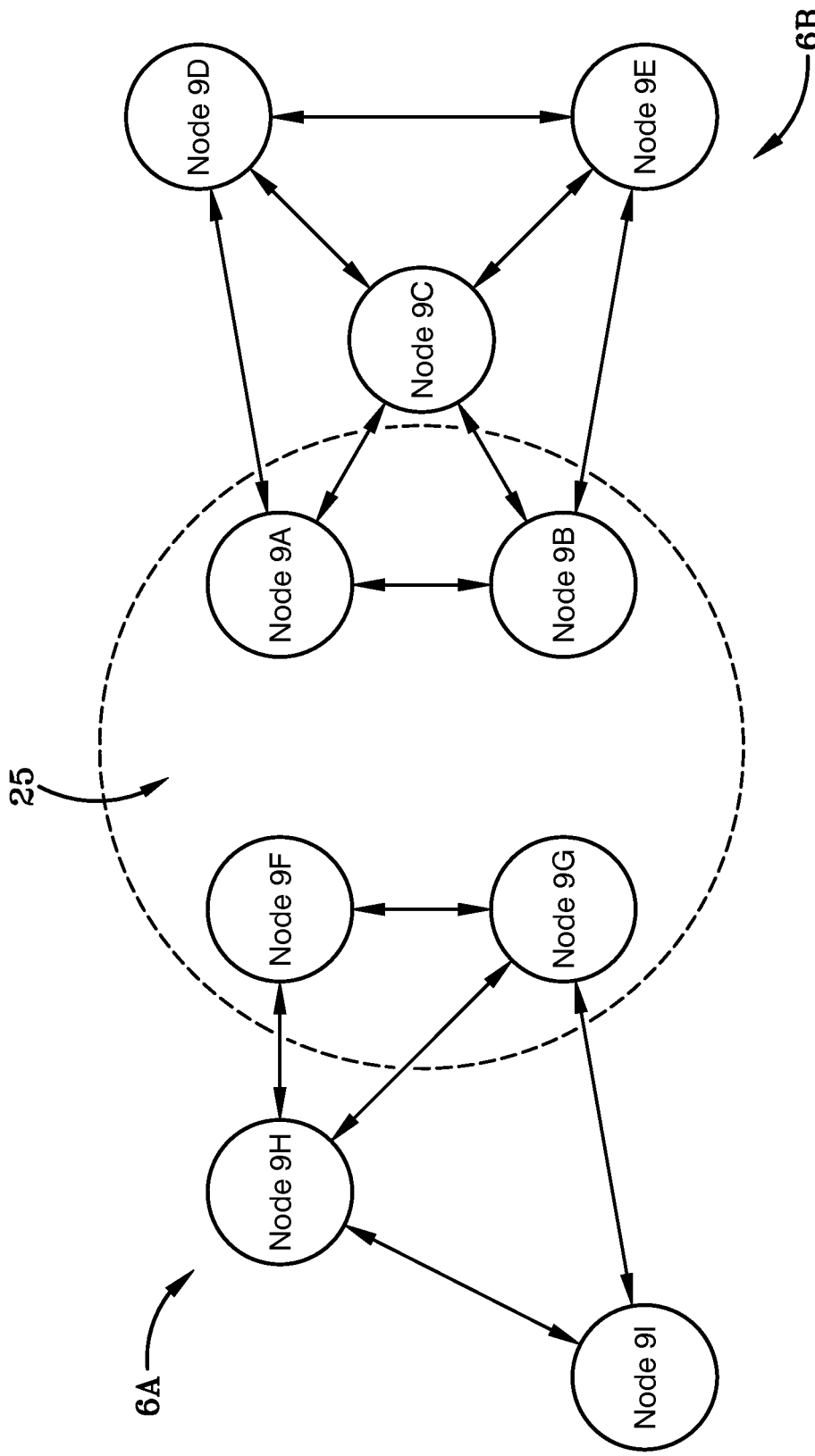
FIG. 6 is a diagrammatical view of two networks of the present invention merging certain edge nodes of each network encircled by a dotted line.

The present invention provides for merging two networks when the networks move into communication proximity to one another. FIG. 6 diagrammatically illustrates two mobile ad hoc networks, a network 6A and a network 6B, merging under system 1 such that one or more nodes 9 of network 6A come into communication range of one or more nodes 9 of network 6B. Such nodes 9 are indicated within a dotted region 25 in FIG. 6. Two scenarios may occur in the event that network 6A merges with network 6B. Under the first scenario, the timing among the edge nodes 9 within dotted region 25 (nodes 9A, 9B, 9F, and 9G) is not precisely aligned with one another, but the timing is within the tolerable range where it is still possible for successful detection of the transmitted preambles 13 between network 6A and network 6B. Under the second scenario, the timing amongst the edge nodes 9 within dotted region 25 is so skewed that the nodes 9 cannot successfully detect transmitted preambles 13.

System 1 is implemented to address the first scenario in a manner similar to that discussed previously with respect to nodes 9 within network 6 adjusting their clock 8. As such, upon detection of preamble 13 from a merging network 6, the receiving node 9 compares the actual arrival time of the preamble with the expected arrival time of preamble 13 and adjusts clock 8 of the receiving node 9 accordingly. Conversely, when the receiving node 9 later sends its own preamble 13, other nodes 9 receive and adjust their clock 8 variable accordingly and the edge nodes of the two networks are synchronized. Inasmuch as the two networks 6A and 6B are internally synchronized within system 1, synchronizing the edge nodes, such as those shown in dotted region 25, effectively merges networks 6A and 6B. Nodes 9 update their internal variables across the new network such as hop counts, slot number 12, and network identification information. Nodes further update routing tables, and generally perform any steps necessary to update the structure of the network to account for the new nodes.

System 1 is implemented to address the second scenario in the following manner. One familiar in the art will recognize that if the timing amongst the edge nodes 9 within dotted region 25 is so skewed that nodes 9 cannot successfully transmit preambles 13, there will be an increasing number of collisions of the transmitted frames/slots from both networks 6A and 6B. Shown in FIG. 6, nodes 9 may include a rate variable 26 stored in memory 16. Once the collisions reach a particular threshold for a particular node 9, for example when the number of collisions surpass rate variable 26, that node 9 will cast itself out of its current network and try to find a network 6 to join by initiating a restart/resync procedure. Any of the known restart/resync procedures known in the art for attempting to join a network may be used under this scenario. However, under one embodiment of system 1, networks 6 may include a network identifier 27 and allow the cast out nodes 9 to retain the network identifier 27 of its former network. Network identifier 27 may be any kind of identifier, including a simple numerical value integer. When the cast out node 9 is in a restart/resync procedure, node 9 listens for signals from another node 9. When the cast out node 9 receives a transmission from another node 9, cast out node 9 compares its former network identifier 27 with the network identifier 27 provided by the transmitting node 9. System 1 provides for giving the lowest received network identifier 27 preference as well as forcing a cast out node 9 to ignore its former network and networks having a higher network identifier 27 for a set period in an attempt to find a new network. The set period of time may be a timer or a number of received preambles 13 from that network identifier 27, or any other manner of forcing the cast out node 9 to keep searching for a new network for a set period.

For example, if cast out node 9A includes a former network identifier 27A equal to eight, when cast out node 9A receives a transmission from another node 9B, network identifier 27B of node 9B is compared to network identifier 27A of cast out node 9A. If network identifier 27B is eight or greater, cast out node 9A will continue to look for a new network for a set amount of time or a set amount of receptions from node 9B, for example five receptions. If network identifier 27B is less than eight, cast out node 9A will join the network associated with node 9B in any manner known in the art. The described preferential treatment towards networks having less than network identifier 27 of cast out node 9 resolves the issue of cast out nodes 9 ping-ponging back and forth between the two merging networks. In such an implementation, when two networks move within communication proximity to one another, a cascade effect will take place where edge nodes 9 collide with one another, cast themselves out, and thereafter join or rejoin the network having the lowest network identifier 27. This causes the new edge nodes 9 to collide and start the above process over. Eventually all of the nodes from the network having the highest network identifier 27 will migrate and join the network having the lower network identifier 27 and the two networks are merged into one.

System 1 may implement a method for improving reception capabilities for cast out nodes 9. In one embodiment, cast out node 9 purposely changes its configured slot size 10 to be approximately equal to the size of preamble 13. Cast out node 9 thereafter only transmits preamble 13 during its time slot 5. This allows the cast out node 9 to listen during the remaining part of the time slot 5 previously assigned to the cast out node 9. Thus, cast out node 9 listens as much as possible within system 1, as a preamble 13 transmission time is required to allow the cast out node 9 to search for other nodes 9. In lieu of preamble 13, cast out node 9 may alternatively transmit a customized small header with relevant information for allowing cast out node 9 to connect to a new network 6. This header can contain information such as a node identification number, former network identifier 27, previous slot/frame number, and current state. Further, rather than keeping with the previous time slot 5, logic may be included in system 1 to provide for a new transmission timing or frequency, to allow cast out node 9 to transmit occasional short bursts of the preamble 13 or the customized header. As such, all previous time slot assignments are nullified and system logic is implemented to determine when and how often to transmit a short burst containing the header or other vital information. All of the above embodiments relate to providing cast out node 9 with the maximum possible listening time while the node 9 is not associated with a network, while still allowing a short transmission for use in searching for networks. Any similar methods relating to such concepts are within the scope of system 1.

Figure 8:
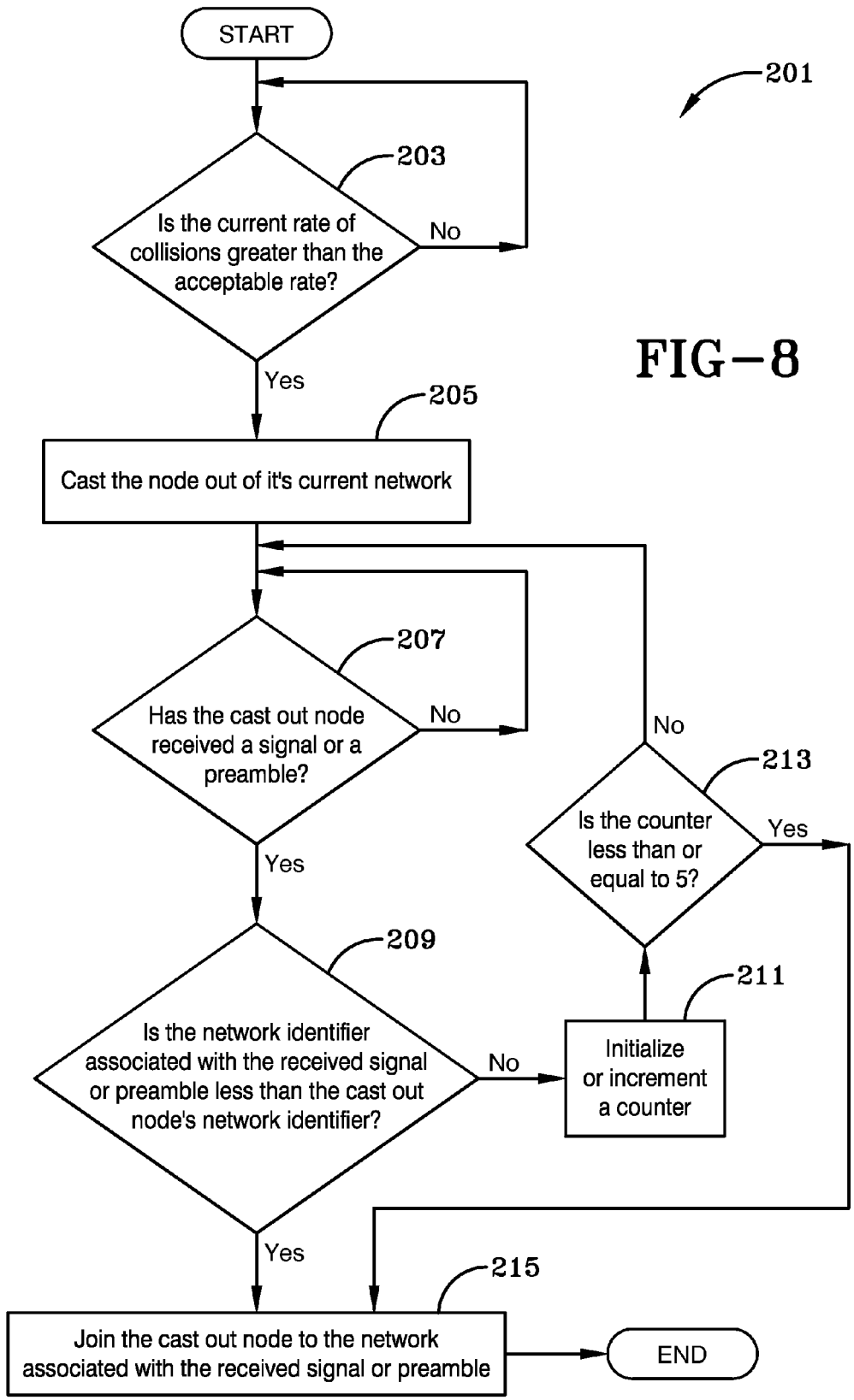
FIG. 8 is a method of the present invention for joining a cast out node to a network.

FIG. 8 illustrates a method 201 for facilitating network merging in the present invention when edge nodes 9 experience increasing collision rates. As discussed above, system 1 senses when one network 6A is in communication proximity with another network 6B because edge nodes experience an increase in collisions. Nodes 9 in system 1 cast themselves out of network 6 when their collisions increase beyond a set rate, thereby disassociating themselves from network 6. Method 201 includes a step 203 where a given node 9A monitors its collisions and considers whether the amount of collisions in data transmitted by node 9A is beyond a given rate, for example rate 26 stored in memory 16. If the collisions are below the rate, step 203 loops back to step 203 again to illustrate node 9A repeatedly monitoring its collisions. If the collisions are greater than a set rate, step 203 moves to step 205. In step 205, node 9A casts itself out of network 6A and moves to step 207. In step 207, node 9A considers whether it has received a signal or a preamble 13 from any transmitting nodes 9. If not, step 207 loops back to continuously monitor for a signal or preamble 13. When a signal or preamble 13 is received by node 9A from a node 9B in network 6B, step 207 moves to a step 209. In step 209, node 9A reads network identifier 27B of node 9B and compares it to network identifier 27A of node 9A. If network identifier 27B is equal to or greater than network identifier 27A, step 209 moves to a step 211. In step 211, a counter variable is either initialized or incremented, depending whether this is the first traverse through step 211. Step 211 then continues to a step 213, where the counter is examined. If the counter is less than or equal to five, or some other set iteration number, step 213 continues back to step 207. If step 213 determines the counter has been incremented to five, step 213 continues to a step 215. Similarly, step 209 continues to step 215 if network identifier 27B is less than network identifier 27A. As discussed above, in this embodiment of system 1, preference is given to a lower numbered network to gravitate nodes towards one of the two merging networks 6. Node 9A joins the network 6B in step 215 using any methods commonly understood in the art for network joinder and method 201 thereafter ends.

In light of the above, a frame synchronization system and method has been developed that does not require the exchange of time-stamp information between nodes. This system and method is capable of handling the merging of sub networks and scenarios in which the timing differences between the merging subnets are skewed such that communications among the merging nodes would not normally be feasible. In the system and method described herein, the receiving node(s) adjust their slot timing relative to the received frame preamble adaptively rather than strictly adhering to a static sense of slot timing. This system and method simplifies complexities such as how to decide which node is the timing reference node, how can the reference node change during dynamic operations, and how to accommodate the merging of dynamic sub-networks.

"Logic" or "logic circuitry," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A method for providing channel access synchronization in a time division multiple access (TDMA) multi-hop network employing a plurality of time slots defined within a frame structure which repeats, the method comprising:
   providing a first network of nodes, wherein each node includes a processor connected to a memory by logic circuitry, and a clock variable stored in the memory;
   transmitting a first signal from a first node in the first network of nodes to a second node in the first network of nodes during a first time slot in the plurality of time slots, wherein the first time slot is assigned to the first node;
   using the processor and the clock variable of the second node to calculate an expected arrival time of the first signal at the second node;
   receiving the first signal at the second node at an actual arrival time;
   comparing the expected arrival time to the actual arrival time;
   adjusting the clock variable of the second node if the difference between the expected arrival time and the actual arrival time is greater than a threshold;
   the first node monitoring an amount of collisions of data transmitted by the first node;
   the first node determining whether the amount of collision is beyond a collision rate threshold stored in the memory of the first node;
   the first node casting itself out of the first network of nodes if the amount of collisions is beyond the rate;
   receiving at the first node a second signal from a third node, wherein the third node is in a second network of nodes; and
   joining the first node to the second network of nodes in response to the first node receiving the second signal from the third node.

2. The method of claim 1, further comprising the steps of:
   storing a first network identifier variable associated with the network of nodes in the memory of the first node;
   storing a second network identifier variable associated with the second network of nodes in the memory of the third node;
   comparing the first network identifier and the second network identifier and joining the first node to the second network of nodes if the second network identifier is less than the first network identifier; and
   comparing the first network identifier and the second network identifier and waiting a set time before joining the first node to the second network of nodes if the second network identifier is not less than the first network identifier.

3. The method of claim 1 further comprising the step of sensing when the first network of nodes is proximate the second network of nodes by an increase in collisions in an edge node in the first network of nodes.

4. The method of claim 1 further including the steps of:
each node in the first network of nodes casting itself out of the first network of nodes; and
joining each cast out node with the second network of nodes to merge the first network of nodes with the second network of nodes.

5. A system to provide channel access synchronization without time-stamp exchange in a multi-hop network, said system comprising:
a channel access scheme employing a frame structure which repeats, with a plurality of time slots being defined within said frame structure;
a plurality of nodes communicating via the channel access scheme, each node comprising:
a processor connected to a memory by logic circuitry;
an adjustable clock variable stored in the memory;
a receiver element connected to the memory and processor by the logic circuitry, wherein the receiver element is adapted to receive a signal from a transmitting node and store an actual arrival time in the memory upon receipt of the signal, wherein the transmitting node is one of the other nodes in the network;
an expected arrival time associated with the signal and stored in the memory, wherein the expected arrival time is derived from the clock variable; and
a threshold variable stored in the memory;
wherein the processor adjusts the clock variable if the difference between the expected arrival time and the actual arrival time is greater than the threshold variable; and further including:
a collision rate threshold variable stored in the memory of a first node of the plurality of nodes;
a current rate of collisions variable stored in the memory of the first node and updated by the processor of the first node, wherein the current rate of collisions variable holds a current rate of collisions the first node is experiencing; and
wherein the processor of the first node compares the current rate of collisions variable and the collision rate threshold variable and executes logic for casting the first node out of the network if the current rate of collisions the first node is experiencing is greater than the collision rate threshold variable.

6. The system of claim 5, wherein the clock variable of the node which received the signal is not adjusted if the transmitting node is greater than two network hops from the node which received the signal.

7. The system of claim 6, further including an offset variable calculated by the processor of the node which received the signal and stored in the memory of the node which received the signal, and wherein the processor adjusts the clock variable of the node which received the signal by incrementing the clock variable of the node which received the signal by the offset variable.

8. The system of claim 7, wherein the offset variable is the difference between the actual arrival time and the expected arrival time.

9. The system of claim 5, wherein each node includes a transmitter element connected to the memory and processor by the logic circuitry, and wherein the transmitter element transmits signals during one of the plurality of time slots.

\* \* \* \* \*